US009929668B1

(12) United States Patent
Chen et al.

(10) Patent No.: US 9,929,668 B1
(45) Date of Patent: Mar. 27, 2018

(54) POWDER CONDITIONER WITH REDUCED CAPACITOR VOLTAGE RIPPLES

(71) Applicant: National Taiwan University, Taipei (TW)

(72) Inventors: Yaow-Ming Chen, Taipei (TW); Tung Yueh, Taipei (TW); Terng-Wei Tsai, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 15/669,062

(22) Filed: Aug. 4, 2017

(30) Foreign Application Priority Data

Mar. 10, 2017 (TW) .............................. 106107888 A

(51) Int. Cl.
*H02M 5/458* (2006.01)
*H02M 1/08* (2006.01)
*G05B 15/02* (2006.01)
*H02J 3/36* (2006.01)

(52) U.S. Cl.
CPC .......... *H02M 5/4585* (2013.01); *G05B 15/02* (2013.01); *H02M 1/08* (2013.01); *H02J 3/36* (2013.01); *H02J 2003/365* (2013.01)

(58) Field of Classification Search
CPC ........ H02M 1/08; H02M 1/12; H02M 5/4585; H02J 3/36; H02J 2003/365; G05B 15/02
See application file for complete search history.

(56) References Cited

U.S. PATENT DOCUMENTS

| 2005/0073865 | A1* | 4/2005 | Steigerwald | H02M 1/12 363/47 |
| 2016/0139578 | A1* | 5/2016 | Hasler | H02J 3/18 700/295 |
| 2016/0285273 | A1* | 9/2016 | Leinonen | H02J 3/24 |
| 2016/0329832 | A1* | 11/2016 | Aeloiza | H02M 1/12 |
| 2017/0054294 | A1* | 2/2017 | Lyu | H02J 3/01 |

* cited by examiner

*Primary Examiner* — Jue Zhang
*Assistant Examiner* — Jye-June Lee
(74) *Attorney, Agent, or Firm* — Birch, Stewart, Kolasch & Birch, LLP

(57) ABSTRACT

A power conditioner includes a power converter module, a detector module and a control module. The power converter module performs power conversion upon a three-phase AC power input from a first microgrid based on a PWM output to generate a three-phase AC power output for a second microgrid. The detector module detects the three-phase AC power input, and a first zero sequence current input that is received by the power converter module from the second microgrid. The control module generates the PWM output based at least on a result of the detection, such that the power converter module further receives, from the first microgrid, a second zero sequence current input which is anti-phase with the first zero sequence current input.

12 Claims, 7 Drawing Sheets

POWDER CONDITIONER WITH REDUCED CAPACITOR VOLTAGE RIPPLES

CROSS-REFERENCE TO RELATED APPLICATION

This application claims priority of Taiwanese Patent Application No. 106107888, filed on Mar. 10, 2017.

FIELD

The disclosure relates to a power conditioner, and more particularly to a power conditioner with reduced ripples in capacitor voltages.

BACKGROUND

A conventional power conditioner is used to control power flow between a first microgrid and a second microgrid. Each of the first and second microgrids has a neutral terminal. The conventional power conditioner includes a first power converter that is coupled to the first microgrid and that performs AC (alternating current) to DC (direct current) conversion, a second power converter that is coupled to the second microgrid and that performs DC to AC conversion, a DC bus circuit that is coupled to the first and second microgrids, and other circuits. The DC bus circuit includes two capacitors that are coupled to each other. A common node of the capacitors is coupled to the neutral terminals of the first and second microgrids.

When the second microgrid is in an abnormal state (e.g., the second microgrid encounters frequency fluctuation and/or voltage sag), the second power converter transmits active power and/or reactive power from the capacitors to the second microgrid, so as to alleviate power disturbance of the second microgrid. Meanwhile, the first power converter transmits active power from the first microgrid to the capacitors, so that a voltage across the capacitors can be constant.

However, when the second microgrid provides three unbalanced phase voltages, a zero sequence current input received at the common node of the capacitors from the neutral terminal of the second microgrid has a non-zero amplitude, and therefore a voltage across each capacitor has a ripple component, which accelerates aging of the capacitors and may cause malfunction of the conventional power conditioner.

There are two conventional ways to reduce the ripple component of the voltage across each capacitor. The first conventional way is to increase a capacitance of each capacitor. The second conventional way is to include, in the conventional power conditioner, a power supply that provides DC voltages respectively to the capacitors. However, in the first conventional way, the capacitors would be relatively bulky; in the second conventional way, the power supply is required; and in each conventional way, the conventional power conditioner has relatively high manufacturing costs.

SUMMARY

Therefore, an object of the disclosure is to provide a power conditioner that can alleviate the drawbacks of the prior art.

According to the disclosure, the power conditioner is used to control power flow between a first microgrid and a second microgrid. Each of the first and second microgrids has a neutral terminal. The power conditioner includes a power converter module, a detector module and a control module. The power converter module is used to be coupled to the first microgrid for receiving a three-phase AC (alternating current) power input therefrom, is used to be coupled further to the second microgrid, further receives a PWM (pulse width modulation) output, and includes two capacitors that are coupled to each other. A common node of the capacitors is used to be coupled to the neutral terminal of the first microgrid, and is used to be coupled further to the neutral terminal of the second microgrid for receiving a first zero sequence current input therefrom. The power converter module performs AC to DC (direct current) to AC conversion upon the three-phase AC power input based on the PWM output to generate a DC voltage across the capacitors, and to generate a three-phase AC power output for the second microgrid. The detector module is coupled to the power converter module, detects voltages and current inputs of the three-phase AC power input to generate a first detection output, and further detects the first zero sequence current input to generate a second detection output. The control module is coupled to the detector module for receiving the first and second detection outputs therefrom, and is coupled further to the power converter module. The control module generates the PWM output for the power converter module based at least on the first and second detection outputs, such that the common node of the capacitors further receives, from the neutral terminal of the first microgrid, a second zero sequence current input which has a non-zero amplitude and is anti-phase with the first zero sequence current input when the first zero sequence current input has a non-zero amplitude.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
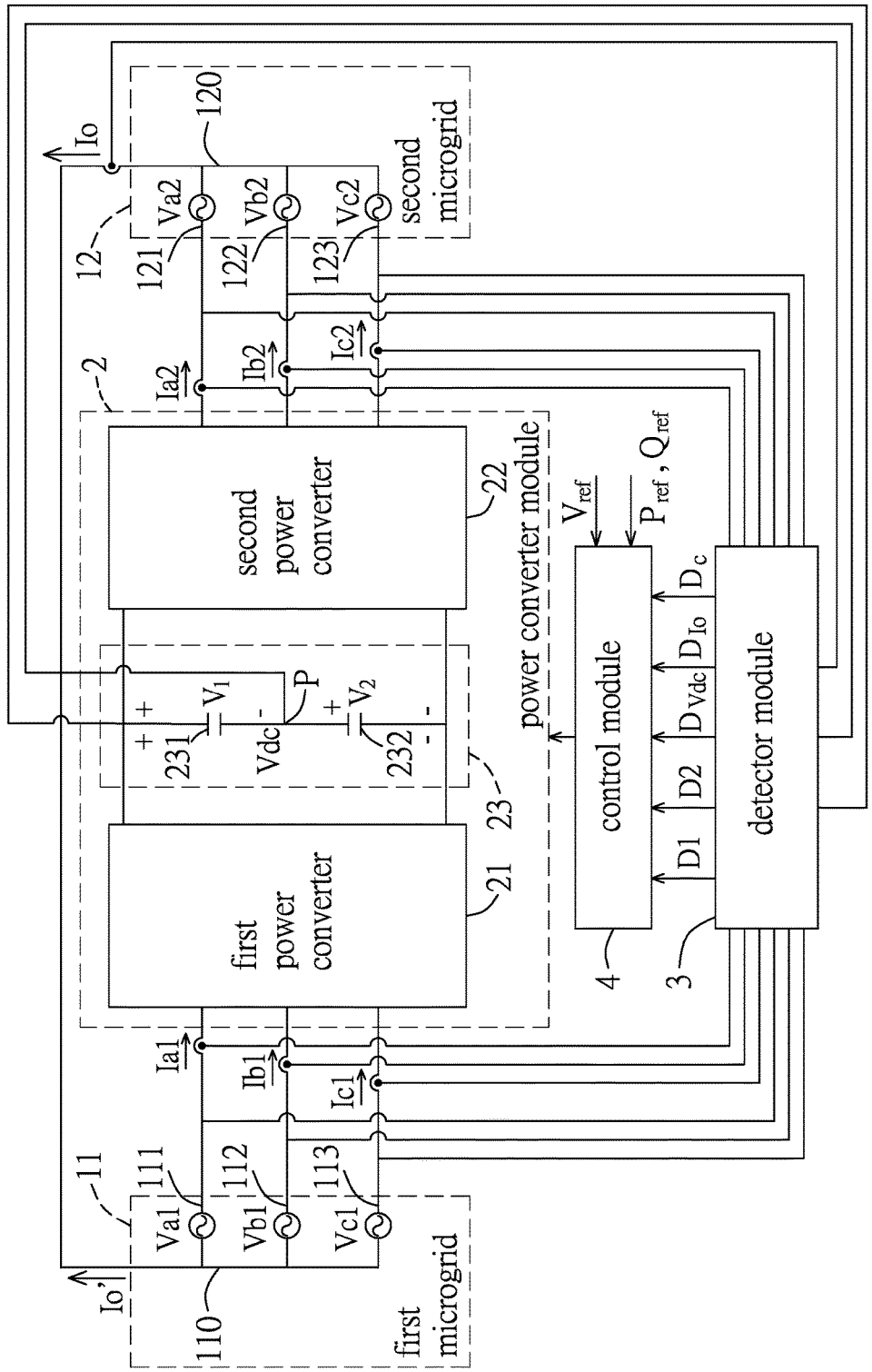
FIG. 1 is a circuit block diagram illustrating an embodiment of a power conditioner according to the disclosure.

Referring to FIG. 1, an embodiment of a power conditioner according to the disclosure is used to control power flow between a first microgrid 11 and a second microgrid 12. Each of the first and second microgrids 11, 12 is a three-phase four-wire system, has a neutral terminal 110, 120, a first terminal 111, 121, a second terminal 112, 122 and a third terminal 113, 123, and provides three phase voltages (Va1, Vb1, Vc1, Va2, Vb2, Vc2) respectively at the first to third terminals (111-113, 121-123) thereof. The power conditioner of this embodiment includes a power converter module 2, a detector module 3 and a control module 4.

The power converter module 2 includes a DC (direct current) bus circuit 23, a first power converter 21 and a second power converter 22. The DC bus circuit 23 includes two capacitors 231, 232 that are coupled to each other, and that have, for example, the same capacitance. A common node (P) of the capacitors 231, 232 is used to be coupled to the neutral terminal 110 of the first microgrid 11, and is used to be coupled further to the neutral terminal 120 of the second microgrid 12 for receiving a first zero sequence current input (Io) therefrom. The first power converter 21 is used to be coupled to the first to third terminals 111-113 of the first microgrid 11 for receiving a three-phase AC (alternating current) power input therefrom, and is further coupled across the capacitors 231, 232. The second power converter 22 is coupled across the capacitors 231, 232, and is used to be further coupled to the first to third terminals 121-123 of the second microgrid 12. The first and second power converters 21, 22 cooperatively receive a PWM (pulse width modulation) output from the control module 4, and cooperatively perform AC to DC to AC conversion upon the three-phase AC power input based on the PWM output to generate a DC voltage (Vdc) across the capacitors 231, 232, and to generate a three-phase AC power output for the second microgrid 12.

Figure 2:
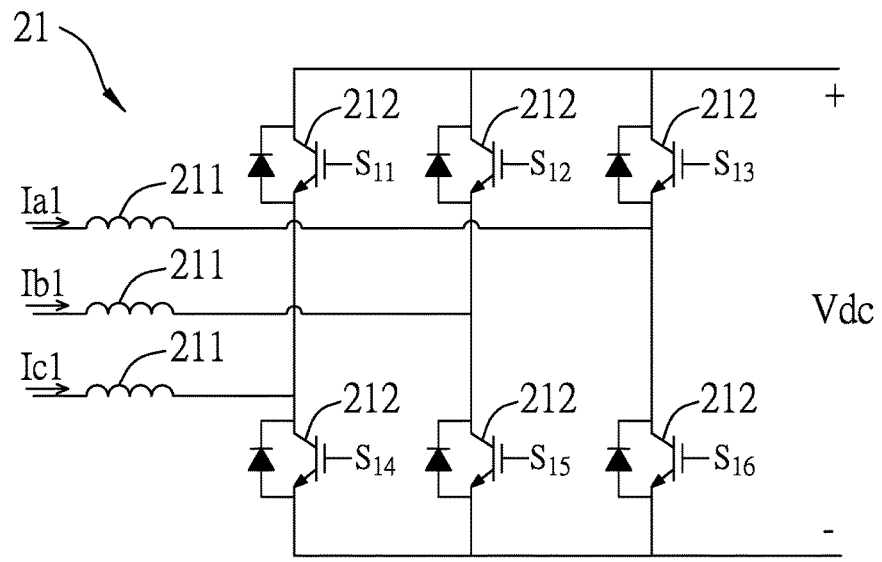
FIG. 2 is a circuit diagram illustrating a first power converter of the embodiment.
Figure 3:
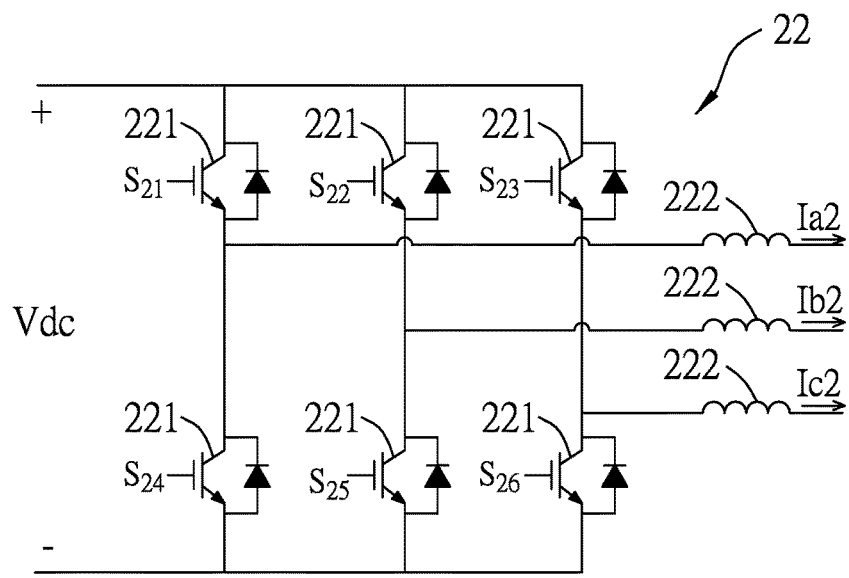
FIG. 3 is a circuit diagram illustrating a second power converter of the embodiment.

Referring to FIGS. 2 and 3, in this embodiment, the PWM output includes a first group of six PWM signals ($S_{11}$-$S_{16}$) as shown in FIG. 2, and a second group of six PWM signals ($S_{21}$-$S_{26}$) as shown in FIG. 3. As shown in FIG. 2, the first power converter 21 includes three inductors 211 and six switches 212. Each switch 212 is operable between conduction and non-conduction based on a respective PWM signal ($S_{11}$-$S_{16}$) of the first group. As shown in FIG. 3, the second power converter 22 includes six switches 221 and three inductors 222. Each switch 221 is operable between conduction and non-conduction based on a respective PWM signal ($S_{21}$-$S_{26}$) of the second group.

Referring back to FIG. 1, the detector module 3 is coupled to the power converter module 2, detects voltages (i.e., the phase voltages (Va1-Vc1)) and current inputs (Ia1, Ib1, Ic1) of the three-phase AC power input to generate a detection output (D1), detects voltages (i.e., the phase voltages (Va2-Vc2)) and current outputs (Ia2, Ib2, Ic2) of the three-phase AC power output to generate a detection output (D2), detects the DC voltage (Vdc) to generate a detection output ($D_{Vdc}$), detects the first zero sequence current input (Io) to generate a detection output ($D_{Io}$), and detects voltages ($V_1$, $V_2$) respectively across the capacitors 231, 232 to generate a detection output ($D_c$).

The control module 4 is coupled to the detector module 3 for receiving the detection outputs (D1, D2, $D_{Vdc}$, $D_{Io}$, $D_c$) therefrom, is coupled further to the power converter module 2, and further receives a target voltage value ($V_{ref}$) and two target power values ($P_{ref}$, $Q_{ref}$). The control module 4 generates the PWM output for the power converter module 2 based on the detection outputs (D1, D2, $D_{Vdc}$, $D_{Io}$, $D_c$), the target voltage value ($V_{ref}$) and the target power values ($P_{ref}$, $Q_{ref}$) such that: (a) the DC voltage (Vdc) is stabilized at the target voltage value ($V_{ref}$); (b) the common node (P) of the capacitors 231, 232 further receives a second zero sequence current input (Io') from the neutral terminal 110 of the first microgrid 11; and (c) active power and reactive power of the three-phase AC power output are respectively stabilized at the target power values ($P_{ref}$, $Q_{ref}$). When the first zero sequence current input (Io) has a non-zero amplitude, the second zero sequence current input (Io') has a non-zero amplitude and is anti-phase with the first zero sequence current input (Io). When the amplitude of the first zero sequence current input (Io) is zero, the amplitude of the second zero sequence current input (Io') is also zero. The first and second zero sequence current inputs (Io, Io') are combined at the common node (P) of the capacitors 231, 232 into a compensated zero sequence current input.

Figure 4:
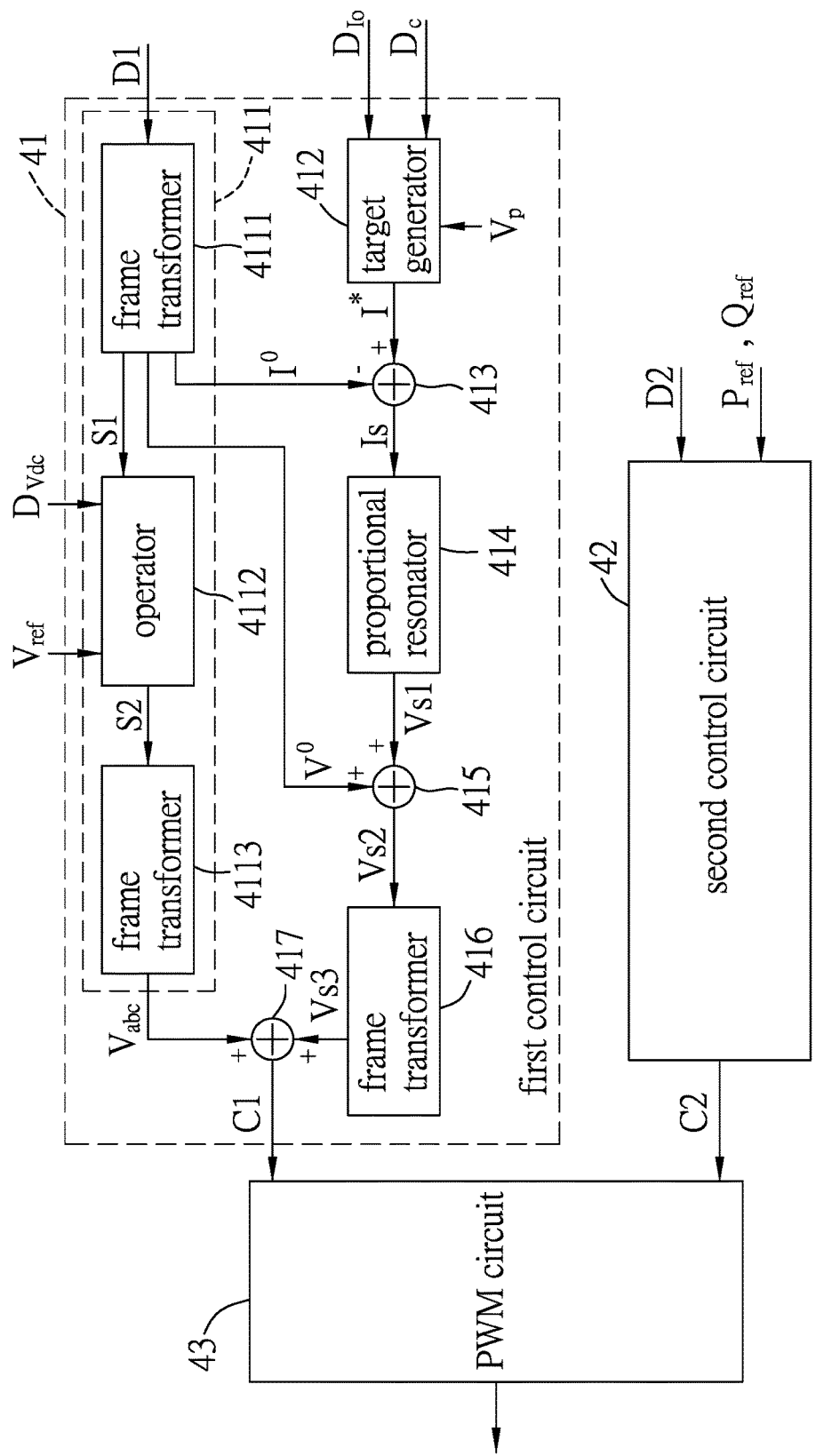
FIG. 4 is a block diagram illustrating a control module of the embodiment.

Referring to FIGS. 1 and 4, in this embodiment, the control module 4 includes a first control circuit 41, a second control circuit 42 and a PWM circuit 43.

The first control circuit 41 is coupled to the detector module 3 for receiving the detection outputs (D1, $D_{Vdc}$, $D_{Io}$, $D_c$) therefrom, further receives the target voltage value ($V_{ref}$) and generates a first control output (C1) based on the detection outputs (D1, $D_{Vdc}$, $D_{Io}$, $D_c$) and the target voltage value ($V_{ref}$).

The second control circuit 42 is coupled to the detector module 3 for receiving the detection output (D2) therefrom, and further receives the target power values ($P_{ref}$, $Q_{ref}$). The second control circuit 42 determines whether the second microgrid 12 is encountering unbalanced voltage sag or not based on the detection output (D2) and a predetermined phase voltage value, and generates a second control output (C2) based on the detection output (D2), the target power values ($P_{ref}$, $Q_{ref}$) and a result of the determination.

In this embodiment, the predetermined phase voltage value equals a rated amplitude (e.g., a rated peak amplitude) of each phase voltage (Va2-Vc2) and the second microgrid 12 is determined as encountering the unbalanced voltage sag when each of some (i.e., at least one but not all) of the voltages (Va2-Vc2) of the three-phase AC power output as indicated by the detection output (D2) has an amplitude (e.g., a peak amplitude) that is less than the predetermined phase voltage value. When the second microgrid 12 is determined as encountering the unbalanced voltage sag, the second control output (C2) is generated in a way as disclosed in FIG. 10 and Equations 33-35 of "Power Controllability of a Three-Phase Converter With an Unbalanced AC Source" by Ke Ma et al., IEEE Transactions on Power Electronics, vol. 30, no. 3, pp. 1591-1604, March 2015; otherwise, the second control output (C2) is generated in a similar way, except that Equations 33-35 are modified as the followings:

$$i_d^+ = \frac{2}{3} \cdot \frac{P_{ref}}{v_d^+}, \quad \text{Equations 33'}$$

$$i_q^+ = \frac{2}{3} \cdot \frac{Q_{ref}}{v_d^+},$$

$$i_d^- = 0,$$

$$i_q^- = 0 \quad \text{Equations 34'}$$

$$i_{Re}^0 = 0,$$

$$i_{Im}^0 = 0. \quad \text{Equations 35'}$$

The PWM circuit 43 is coupled to the first and second control circuits 41, 42 for receiving the first and second control outputs (C1, C2) respectively therefrom, is coupled further to the power converter module 2, and generates the PWM output for the power converter module 2 based on the first and second control outputs (C1, C2). In this embodiment, the PWM output is generated using sinusoidal PWM (SPWM) techniques, the PWM signals ($S_{11}$-$S_{16}$) (see FIG. 2) thereof are generated based on the first control output (C1), and the PWM signals ($S_{21}$-$S_{26}$) (see FIG. 3) thereof are generated based on the second control output (C2).

In this embodiment, the first control circuit 41 includes a command generator 411, a target generator 412, three calculators 413, 415, 417, a proportional resonator 414 and a frame transformer 416.

The command generator 411 is coupled to the detector module 3 for receiving the detection outputs (D1, $D_{Vdc}$) therefrom, and further receives the target voltage value ($V_{ref}$). Each of the voltages (Va1-Vc1) and the current inputs (Ia1-Ic1) of the three-phase AC power input includes a positive sequence component, a negative sequence component and a zero sequence component. The command generator 411 generates, based on the detection outputs (D1, $D_{Vdc}$) and the target voltage value ($V_{Ref}$), first control command ($V_{abc}$) that is associated with the positive and negative sequence components of the voltages (Va1-Vc1) and the current inputs (Ia1-Ic1) of the three-phase AC power input. The command generator 411 further generates, based on the detection output (D1), a zero axis voltage value ($V^0$) that is associated with the zero sequence components of the voltages (Va1-Vc1) of the three-phase AC power input, and a zero axis current value ($I^0$) that is associated with the zero sequence components of the current inputs (Ia1-Ic1) of the three-phase AC power input.

In this embodiment, the command generator 411 includes two frame transformers 4111, 4113 and an operator 4112.

The frame transformer 4111 is coupled to the detector module 3 for receiving the detection output (D1) therefrom, and performs stationary frame to synchronous frame transformation (e.g., Park's transformation) upon the voltages (Va1-Vc1) and the current inputs (Ia1-Ic1) of the three-phase AC power input as indicated by the detection output (D1), so as to generate a transformation output (S1), the zero axis voltage value ($V^0$) and the zero axis current value ($I^0$). In this embodiment, the transformation output (S1) includes a first direct axis voltage value and a first quadrature axis voltage value (which are associated with the positive sequence components of the voltages (Va1-Vc1) of the three-phase AC power input), a second direct axis voltage value and a second quadrature axis voltage value (which are associated with the negative sequence components of the voltages (Va1-Vc1) of the three-phase AC power input), a first direct axis current value and a first quadrature axis current value (which are associated with the positive sequence components of the current inputs (Ia1-Ic1) of the three-phase AC power input), and a second direct axis current value and a second quadrature axis current value (which are associated with the negative sequence components of the current inputs (Ia1-Ic1) of the three-phase AC power input).

The operator 4112 is coupled to the frame transformer 4111 and the detector module 3 for receiving the transformation output (S1) and the detection output ($D_{Vdc}$) respectively therefrom, further receives the target voltage value ($V_{ref}$), and generates an operation output (S2) based on the transformation output (S1), the detection output ($D_{Vdc}$) and the target voltage value ($V_{ref}$). In this embodiment, the operation output (S2) includes a first output portion (which is associated with the positive sequence components of the voltages (Va1-Vc1) and the current inputs (Ia1-Ic1) of the three-phase AC power input), and a second output portion (which is associated with the negative sequence components of the voltages (Va1-Vc1) and the current inputs (Ia1-Ic1) of the three-phase AC power input). The operator 4112 calculates, based on the DC voltage (Vdc) indicated by the detection output ($D_{Vdc}$) and on the target voltage value ($V_{ref}$), a first target current value that corresponds to the first direct axis current value. The operator 4112 generates the first output portion based on the first direct axis voltage value, the first quadrature axis voltage value, the first direct axis current value, the first quadrature axis current value, the first target current value, and a predetermined second target current value (which corresponds to the first quadrature axis current value, and which is, for example, zero). The operator 4112 generates the second output portion based on the second direct axis voltage value, the second quadrature axis voltage value, the second direct axis current value, the second quadrature axis current value, and a predetermined third target current value and a predetermined fourth target current value (which respectively correspond to the second direct axis current value and the second quadrature axis current value, and which are, for example, zero).

The frame transformer 4113 is coupled to the operator 4112 for receiving the operation output (S2) therefrom, and performs synchronous frame to stationary frame transformation (e.g., inverse Park's transformation) upon the operation output (S2) to generate the first control command ($V_{abc}$). In this embodiment, the first control command ($V_{abc}$) includes a first command portion that is generated based on the first output portion of the operation output (S2), and a second command portion that is generated based on the second output portion of the operation output (S2).

The target generator 412 is coupled to the detector module 3 for receiving the detection outputs ($D_{Io}$, $D_c$) therefrom, and generates a target current value (I*) based on the detection outputs ($D_{Io}$, $D_c$) and a predetermined threshold voltage value ($V_p$). In this embodiment, first, the target generator 412 determines whether a minimum of the voltages ($V_1$, $V_2$) respectively across the capacitors 231, 232 as indicated by the detection output ($D_c$) is greater than the predetermined threshold voltage value ($V_p$), and obtains a compensation factor (k) based on a result of the determination and the detection output ($D_c$). When the minimum of the voltages ($V_1$, $V_2$) respectively across the capacitors 231, 232 as indicated by the detection output ($D_c$) is determined to be greater than the predetermined threshold voltage value ($V_p$) (e.g., $V_p=V_{peak}\times110\%$, where $V_{peak}$ denotes a rated peak amplitude of each phase voltage (Va1-Vc1, Va2-Vc2)), the compensation factor (k) is set to a predetermined constant that is greater than zero and that is less than or equal to one (i.e., 0<k≤1). When the minimum of the voltages ($V_1$, $V_2$) respectively across the capacitors 231, 232 as indicated by the detection output ($D_c$) is determined to be not greater than the predetermined threshold voltage value ($V_p$), the compensation factor (k) is obtained according to the following equation:

$$k = \frac{2\times(V_p - V_{1,min})}{V_{1,r}}, \quad \text{Equation 1}$$

where $V_{1,min}$ denotes the minimum of the voltages ($V_1$, $V_2$) respectively across the capacitors 231, 232 as indicated by the detection output ($D_c$), and $V_{1,r}$ denotes a difference between a maximum and a minimum of the voltage ($V_1$, $V_2$) across one of the capacitors 231, 232 as indicated by the detection output ($D_c$). Second, the target generator 412 obtains the target current value (I*) based on the compensation factor (k) and the detection output ($D_{Io}$) according to the following equation:

$$I^* = -k \times i^0,$$

where $i^0$ denotes the first zero sequence current input (Io) indicated by the detection output ($D_{Io}$).

The calculator 413 is coupled to the frame transformer 4111 and the target generator 412 for receiving the zero axis current value ($I^0$) and the target current value (I*) respectively therefrom, and calculates a difference between the zero axis current value ($I^0$) and the target current value (I*) to generate a difference current value (Is). In this embodiment, Is=I*−$I^0$.

The proportional resonator 414 is coupled to the calculator 413 for receiving the difference current value (Is) therefrom, and generates a first voltage value (Vs1) based on the difference current value (Is).

The calculator 415 is coupled to the frame transformer 4111 and the proportional resonator 414 for receiving the zero axis voltage value ($V^0$) and the first voltage value (Vs1) respectively therefrom, and calculates a second voltage value (Vs2) based on the zero axis voltage value ($V^0$) and the first voltage value (Vs1). In this embodiment, Vs2=$V^0$+Vs1.

The frame transformer 416 is coupled to the calculator 415 for receiving the second voltage value (Vs2) therefrom, and performs synchronous frame to stationary frame transformation (e.g., inverse Park's transformation) upon the second voltage value (Vs2) to generate a second control command (Vs3).

The calculator 417 is coupled to the frame transformers 4113, 416 for receiving the first and second control commands ($V_{abc}$, Vs3) respectively therefrom, is coupled further to the PWM circuit 43, and calculates a sum of the first and second command portions of the first control command ($V_{abc}$) and the second control command (Vs3) to generate the first control output (C1) for the PWM circuit 43.

An example of parameters of the power conditioner of this embodiment and the first and second microgrids 11, 12 are shown in the following Table 1.

TABLE 1

| | |
|---|---|
| a rated power of each of the first and second power converters 21, 22 | 5 kVA |
| a rated root mean square amplitude of each phase voltage (Va1-Vc1, Va2-Vc2) | 220 V |
| the target voltage value ($V_{ref}$) | 700 V |
| an inductance of each inductor 211, 222 (see FIGS. 2 and 3) | 2 mH |
| a switching frequency of each PWM signal ($S_{11}$-$S_{16}$, $S_{21}$-$S_{26}$) (see FIGS. 2 and 3) | 20 kHz |

Figure 5:
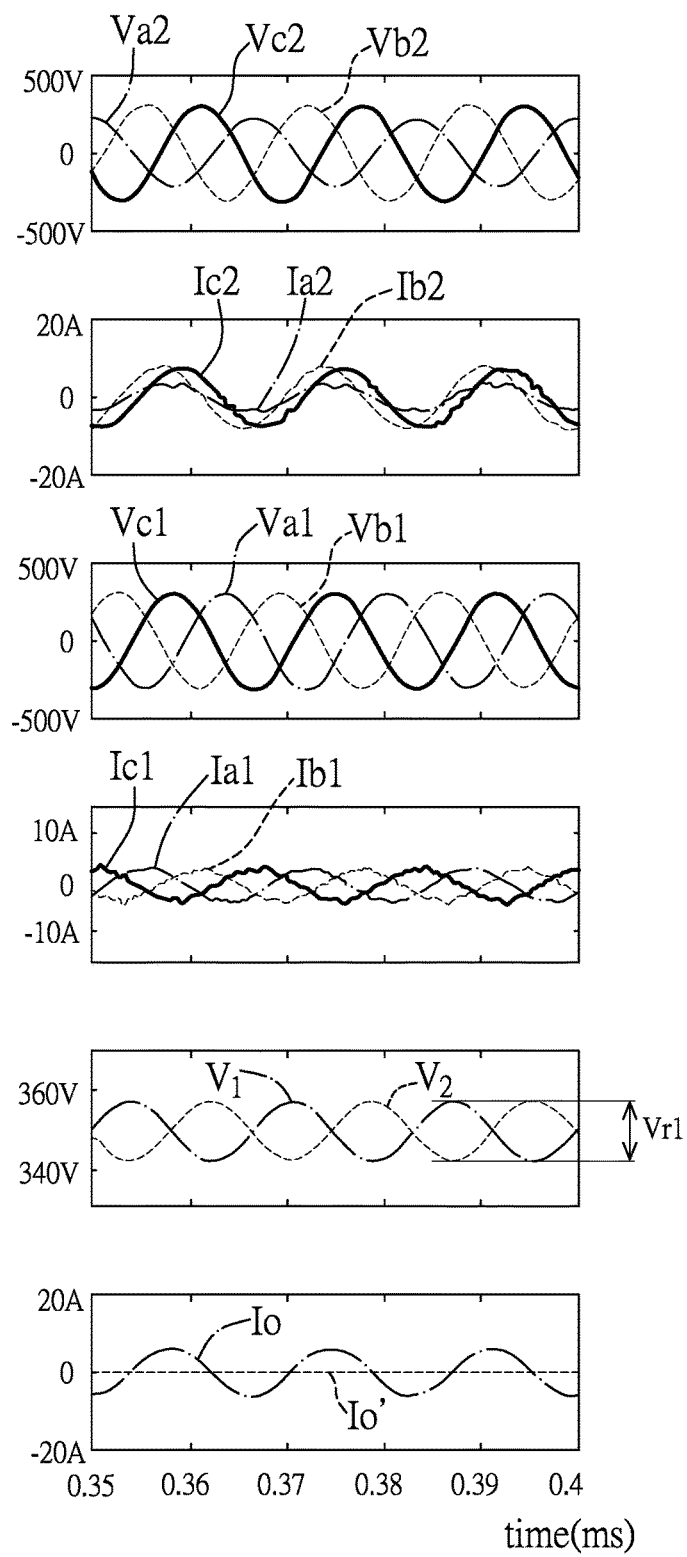
FIG. 5 is a timing diagram illustrating six phase voltages, five current inputs, three current outputs, and voltages respectively across two capacitors of the power conditioner without current compensation under a first circumstance.
Figure 6:
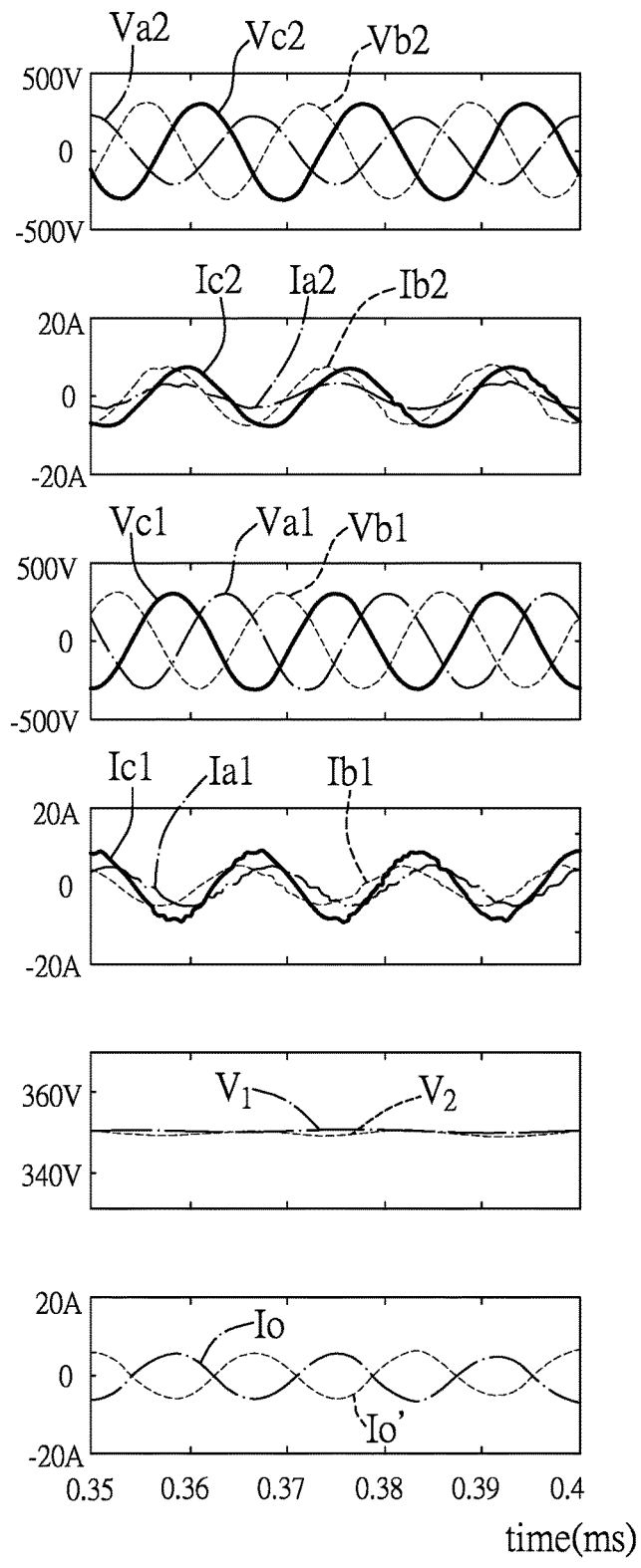
FIG. 6 is a timing diagram illustrating the phase voltages, the current inputs, the current outputs, and the voltages respectively across the capacitors of the embodiment under the first circumstance.
Figure 7:
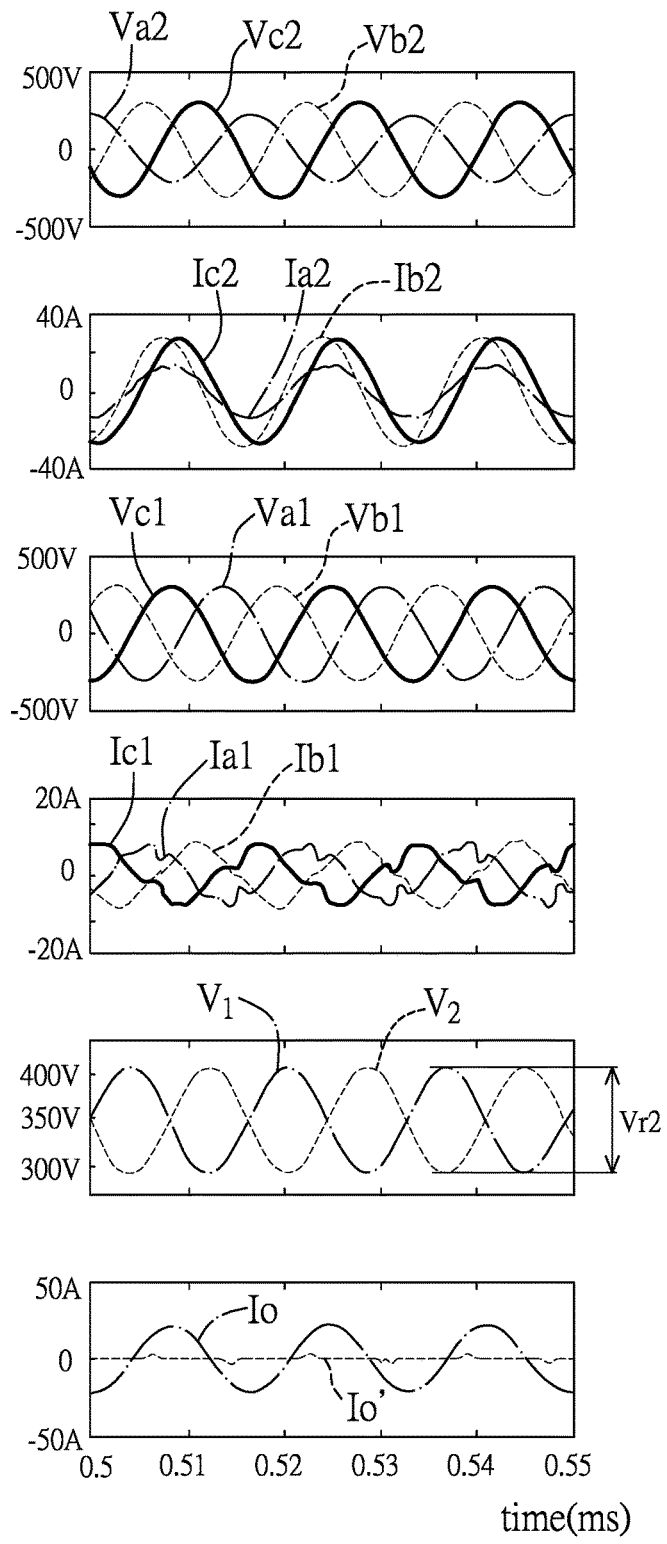
FIG. 7 is a timing diagram illustrating the phase voltages, the current inputs, the current outputs, and the voltages respectively across the capacitors of the power conditioner without current compensation under a second circumstance.
Figure 8:
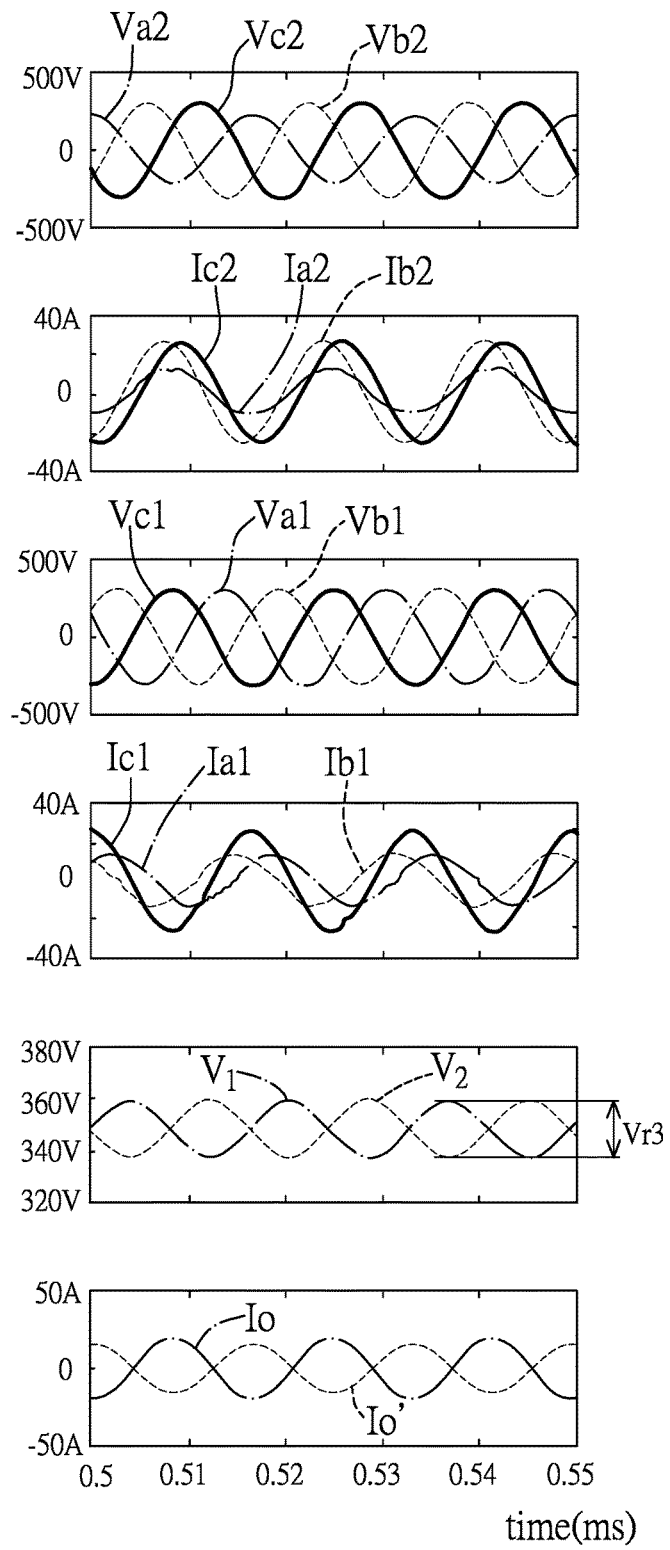
FIG. 8 is a timing diagram illustrating the phase voltages, the current inputs, the current outputs, and the voltages respectively across the capacitors of the embodiment under the second circumstance.

Assuming that the power conditioner of this embodiment and the first and second microgrids 11, 12 have the parameters shown in Table 1, and that the predetermined constant is one, FIGS. 5 and 6 respectively illustrate a simulation result of the power conditioner without current compensation (e.g., the elements 412-416 are omitted) and a simulation result of the power conditioner of this embodiment under a first circumstance (where the target power values ($P_{ref}$, $Q_{ref}$) are respectively 1.5 W and 0 kVar, where the capacitance of each capacitor 231, 232 is 3.3 mF, and where the amplitude of the phase voltage (Va2) is less than the predetermined phase voltage value), and FIGS. 7 and 8 respectively illustrate a simulation result of the power conditioner without current compensation and a simulation result of the power conditioner of this embodiment under a second circumstance (where the target power values ($P_{ref}$, $Q_{ref}$) are respectively 5 kW and 0 kVar, where the capacitance of each capacitor 231, 232 is 1.65 mF, and where the amplitude of the phase voltage (Va2) is less than the predetermined phase voltage value).

Referring to FIGS. 5 and 6, under the first circumstance, the amplitude of the first zero sequence current input (Io) is non-zero. As shown in FIG. 5, without current compensation, the second zero sequence current input (Io') is not generated, the voltage ($V_1$, $V_2$) across each capacitor 231, 232 (see FIG. 1) has a ripple component, and the minimum of the voltages ($V_1$, $V_2$) respectively across the capacitors 231, 232 (see FIG. 1) is greater than the predetermined threshold voltage value ($V_p$) (i.e., 342V). In this embodiment, the second zero sequence current input (Io') is generated. Initially, the minimum of the voltages ($V_1$, $V_2$) respectively across the capacitors 231, 232 (see FIG. 1) equals that of the power conditioner without current compensation as shown in FIG. 5, and is greater than the predetermined threshold voltage value ($V_p$) (i.e., 342V). Therefore, the compensation factor is set to the predetermined constant of one. Thereafter, as shown in FIG. 6, the second zero sequence current input (Io') is non-zero in amplitude, is substantially equal to the first zero sequence current input (Io) in amplitude, and is substantially opposite to the first zero sequence current input (Io) in phase; and the ripple component of the voltage ($V_1$, $V_2$) across each capacitor 231, 232 is reduced to nearly zero as compared to that of the power conditioner without current compensation.

Referring to FIGS. 7 and 8, under the second circumstance, the amplitude of the first zero sequence current input (Io) is non-zero. As shown in FIG. 7, without current compensation, the second zero sequence current input (Io') is not generated, the voltage ($V_1$, $V_2$) across each capacitor 231, 232 (see FIG. 1) has a ripple component, and the minimum of the voltages ($V_1$, $V_2$) respectively across the capacitors 231, 232 (see FIG. 1) is less than the predetermined threshold voltage value ($V_p$) (i.e., 342V). In this embodiment, the second zero sequence current input (Io') is generated. Initially, the minimum of the voltages ($V_1$, $V_2$) respectively across the capacitors 231, 232 (see FIG. 1) equals that of the power conditioner without current compensation as shown in FIG. 7, and is less than the predetermined threshold voltage value ($V_p$) (i.e., 342V). Therefore, the compensation factor obtained according to Equation 1 is less than one. Thereafter, as shown in FIG. 8, the second zero sequence current input (Io') is non-zero in amplitude, is less than the first zero sequence current input (Io) in amplitude, and is opposite to the first zero sequence current input (Io) in phase; and the ripple component of the voltage ($V_1$, $V_2$) across each capacitor 231, 232 is reduced as compared to that of the power conditioner without current compensation.

Referring to FIGS. 1 and 4, in view of the above, the power conditioner of this embodiment has the following advantages:

1. By virtue of the control module 4 that causes the first microgrid 1 to generate the second zero sequence current input (Io'), when the phase voltages (Va2-Vc2) are unbalanced, the ripple component of the voltage ($V_1$, $V_2$) of each capacitor 231, 232 can be reduced. Therefore, aging of the capacitors 231, 232 can be slowed down, and malfunction of the power conditioner can be prevented.

2. By virtue of the control module 4 that causes the first microgrid 1 to generate the second zero sequence current input (Io'), an increase in capacitance of each capacitor 231, 232 is not required, and a power supply that provides DC voltages respectively to the capacitors 231, 232 is not required. Therefore, the capacitors 231, 232 can be relatively compact, and the power conditioner can have relatively low manufacturing costs.

It should be noted that, since the first and second power converters 21, 22 are identical in this embodiment, the power conditioner of this embodiment can be modified such that, the first microgrid 11 provides power to the second microgrid 12 through the modified power conditioner when the second microgrid 12 is in an abnormal state, and that the second microgrid 12 provides power to the first microgrid 11 through the modified power conditioner when the first microgrid 11 is in an abnormal state. In one example of the modified power conditioner, the detector module 3 further detects the second zero sequence current input (Io') to generate a detection output ($D_{Io'}$), and control logic that causes the following operations is included: (a) the first control circuit 41 receives the detection outputs (D1, $D_{Io}$) when the second microgrid 12 is in the abnormal state, and receives the detection outputs (D2, $D_{Io'}$) when the first microgrid 11 is in the abnormal state; (b) the second control circuit 42 receives the detection output (D2) when the second microgrid 12 is in the abnormal state, and receives the detection output (D1) when the first microgrid 11 is in the abnormal state; (c) the first power converter 21 receives the PWM signals ($S_{11}$-$S_{16}$) (see FIG. 2) of the first group when the second microgrid 12 is in the abnormal state, and receives the PWM signals ($S_{21}$-$S_{26}$) (see FIG. 3) of the second group when the first microgrid 11 is in the abnormal state; and (d) the second power converter 22 receives the PWM signals ($S_{21}$-$S_{26}$) (see FIG. 3) of the second group when the second microgrid 12 is in the abnormal state, and receives the PWM signals ($S_{11}$-$S_{16}$) (see FIG. 2) of the first group when the first microgrid 11 is in the abnormal state.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A power conditioner used to control power flow between a first microgrid and a second microgrid, each of the first and second microgrids having a neutral terminal, said power conditioner comprising:
   a power converter module used to be coupled to the first microgrid for receiving a three-phase AC (alternating current) power input therefrom, used to be coupled further to the second microgrid, further receiving a PWM (pulse width modulation) output, and including two capacitors that are coupled to each other, a common node of said capacitors being used to be coupled to the neutral terminal of the first microgrid, and being used to be coupled further to the neutral terminal of the second microgrid for receiving a first zero sequence current input therefrom, said power converter module performing AC to DC (direct current) to AC conversion upon the three-phase AC power input based on the PWM output to generate a DC voltage across said capacitors, and to generate a three-phase AC power output for the second microgrid;
   a detector module coupled to said power converter module, detecting voltages and current inputs of the three-phase AC power input to generate a first detection output, and further detecting the first zero sequence current input to generate a second detection output; and
   a control module coupled to said detector module for receiving the first and second detection outputs therefrom, and coupled further to said power converter module, said control module generating the PWM output for said power converter module based at least on the first and second detection outputs, such that said common node of said capacitors further receives, from the neutral terminal of the first microgrid, a second zero sequence current input which has a non-zero amplitude and is anti-phase with the first zero sequence current input when the first zero sequence current input has a non-zero amplitude.

2. The power conditioner of claim 1, wherein:
   said detector module further detects the DC voltage to generate a third detection output; and
   said control module further receives the third detection output from said detector module, further receives a target voltage value, and generates the PWM output based further on the third detection output and the target voltage value such that the DC voltage is stabilized at the target voltage value.

3. The power conditioner of claim 2, wherein said control module includes:
   a first control circuit coupled to said detector module for receiving the first to third detection outputs therefrom, further receiving the target voltage value, and generating a first control output based at least on the first to third detection outputs and the target voltage value; and
   a PWM circuit coupled to said first control circuit for receiving the first control output therefrom, coupled further to said power converter module, and generating the PWM output for said power converter module based at least on the first control output.

4. The power conditioner of claim 3, each of the voltages and the current inputs of the three-phase AC power input including a positive sequence component, a negative sequence component and a zero sequence component, wherein said first control circuit includes:
   a command generator coupled to said detector module for receiving the first and third detection outputs therefrom, and further receiving the target voltage value, said command generator generating, based on the first and third detection outputs and the target voltage value, a first control command that is associated with the positive and negative sequence components of the voltages and the current inputs of the three-phase AC power input, said command generator further generating, based on the first detection output, a zero axis voltage value that is associated with the zero sequence components of the voltages of the three-phase AC power input, and a zero axis current value that is associated with the zero sequence components of the current inputs of the three-phase AC power input;

a target generator coupled to said detector module for receiving the second detection output therefrom, and generating a target current value based at least on the third detection output;

a first calculator coupled to said command generator and said target generator for receiving the zero axis current value and the target current value respectively therefrom, and calculating a difference between the zero axis current value and the target current value to generate a difference current value;

a proportional resonator coupled to said first calculator for receiving the difference current value therefrom, and generating a first voltage value based on the difference current value;

a second calculator coupled to said command generator and said proportional resonator for receiving the zero axis voltage value and the first voltage value respectively therefrom, and calculating a second voltage value based on the zero axis voltage value and the first voltage value;

a first frame transformer coupled to said second calculator for receiving the second voltage value therefrom, and performing synchronous frame to stationary frame transformation upon the second voltage value to generate a second control command; and a third calculator coupled to said command generator and said first frame transformer for receiving the first and second control commands respectively therefrom, coupled further to said PWM circuit, and calculating a sum of the first and second control commands to generate the first control output for said PWM circuit.

5. The power conditioner of claim 4, wherein the target current value is obtained according to the following equation:

$$I^* = -k \times i^0,$$

where $I^*$ denotes the target current value, k denotes a compensation factor, and $i^0$ denotes the first zero sequence current input indicated by the second detection output.

6. The power conditioner of claim 5, wherein:

said detector module further detects voltages respectively across said capacitors to generate a fourth detection output;

said target generator further receives the fourth detection output from said detector module, and generates the target current value based further on the fourth detection output and a predetermined threshold voltage value.

7. The power conditioner of claim 6, wherein:

when a minimum of the voltages respectively across said capacitors as indicated by the fourth detection output is determined to be greater than the predetermined threshold voltage value, the compensation factor is set to a predetermined constant that is greater than zero and that is less than or equal to one.

8. The power conditioner of claim 6, wherein:

when a minimum of the voltages respectively across said capacitors as indicated by the fourth detection output is determined to be not greater than the predetermined threshold voltage value, the compensation factor is obtained according to the following equation:

$$k = \frac{2 \times (V_p - V_{1,min})}{V_{1,r}},$$

where $V_p$ denotes the predetermined threshold voltage value, $V_{1,min}$ denotes the minimum of the voltages respectively across said capacitors as indicated by the fourth detection output, and $V_{1,r}$ denotes a difference between a maximum and a minimum of the voltage across one of said capacitors as indicated by the fourth detection output.

9. The power conditioner of claim 4, wherein said command generator includes:

a second frame transformer coupled to said detector module for receiving the first detection output therefrom, and coupled further to said first and second calculators, said second frame transformer performing stationary frame to synchronous frame transformation upon the voltages and the current inputs of the three-phase AC power input as indicated by the first detection output to generate the zero axis current value for said first calculator, the zero axis voltage value for said second calculator, and a transformation output that is associated with the positive and negative sequence components of the voltages and the current inputs of the three-phase AC power input;

an operator coupled to said second frame transformer and said detector module for receiving the transformation output and the third detection output respectively therefrom, further receiving the target voltage value, and generating an operation output based on the transformation output, the third detection output and the target voltage value; and a third frame transformer coupled to said operator for receiving the operation output therefrom, coupled further to said third calculator, and performing synchronous frame to stationary frame transformation upon the operation output to generate the first control command for said third calculator.

10. The power conditioner of claim 3, wherein:

said detector module further detects voltages and current outputs of the three-phase AC power output to generate a fourth detection output;

said control module further includes a second control circuit that is coupled to said detector module for receiving the fourth detection output therefrom, that further receives two target power values, and that generates a second control output based at least on the fourth detection output and the target power values; and said PWM circuit is coupled further to said second control circuit for receiving the second control output therefrom, and generates the PWM output based further on the second control output such that active power and reactive power of the three-phase AC power output are respectively stabilized at the target power values.

11. The power conditioner of claim 10, wherein said second control circuit further determines whether the second microgrid is encountering unbalanced voltage sag or not based on the fourth detection output and a predetermined phase voltage value, and generates the second control output based further on a result of the determination.

12. The power conditioner of claim 11, wherein the second microgrid is determined to be encountering the unbalanced voltage sag when each of some of the voltages of the three-phase AC power output as indicated by the fourth detection output has an amplitude that is less than the predetermined phase voltage value.

\* \* \* \* \*